(12) United States Patent
Gaiarsa et al.

(10) Patent No.: US 10,534,644 B2
(45) Date of Patent: Jan. 14, 2020

(54) METHOD AND SYSTEM FOR A CPU-LOCAL STORAGE MECHANISM

(75) Inventors: Andrew Gaiarsa, Carp (CA); Maarten Koning, Bloomfield (CA)

(73) Assignee: Wind River Systems, Inc., Alameda, CA (US)

( * ) Notice: Subject to any disclaimer, the term of this patent is extended or adjusted under 35 U.S.C. 154(b) by 954 days.

(21) Appl. No.: 12/491,534

(22) Filed: Jun. 25, 2009

(65) Prior Publication Data
US 2010/0332796 A1    Dec. 30, 2010

(51) Int. Cl.
*G06F 9/50* (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS

| | | | | |
|---|---|---|---|---|
| 8,051,418 B1* | 11/2011 | Dice | ..................... | G06F 9/5033 711/147 |
| 2004/0044843 A1* | 3/2004 | Dawson | ................ | G06F 3/0605 711/112 |
| 2004/0268353 A1* | 12/2004 | Kanai et al. | ................... | 718/100 |
| 2006/0074993 A1* | 4/2006 | Pulamarasetti | ..... | G06F 11/1458 |
| 2007/0106986 A1* | 5/2007 | Worley, Jr. | .......... | G06F 9/45537 718/1 |
| 2007/0162520 A1* | 7/2007 | Petersen | ................ | G06F 11/141 |
| 2008/0271017 A1* | 10/2008 | Herington | ........... | G06F 9/45558 718/1 |
| 2009/0235033 A1* | 9/2009 | Holt | .............................. | 711/148 |
| 2010/0077185 A1* | 3/2010 | Gopalan | ............... | G06F 9/5033 712/220 |
| 2010/0205604 A1* | 8/2010 | Brower | ..................... | G06F 9/52 718/102 |
| 2010/0235847 A1* | 9/2010 | Brehmer et al. | .............. | 719/328 |

OTHER PUBLICATIONS

Dunkels et al. (Run-Time Dynamic Linking for Reprogramming Wireless Sensor Networks, Nov. 2006, pp. 15-28).*

* cited by examiner

*Primary Examiner* — George Giroux
(74) *Attorney, Agent, or Firm* — Fay Kaplun & Marcin, LLP

(57) ABSTRACT

Described herein are systems and methods for implementing a processor-local (e.g., a CPU-local) storage mechanism. An exemplary system includes a plurality of processors executing an operating system, the operating system including a processor local storage mechanism, wherein each processor accesses data unique to the processor based on the processor local storage mechanism. Each of the plurality of processors of the system may have controlled access to the resource and each of the processors is dedicated to one of a plurality of tasks of an application. The application including the plurality of tasks may be replicated using the processor local storage mechanism, wherein each of the tasks of the replicated application includes an affinity to one of the plurality of processors.

20 Claims, 4 Drawing Sheets

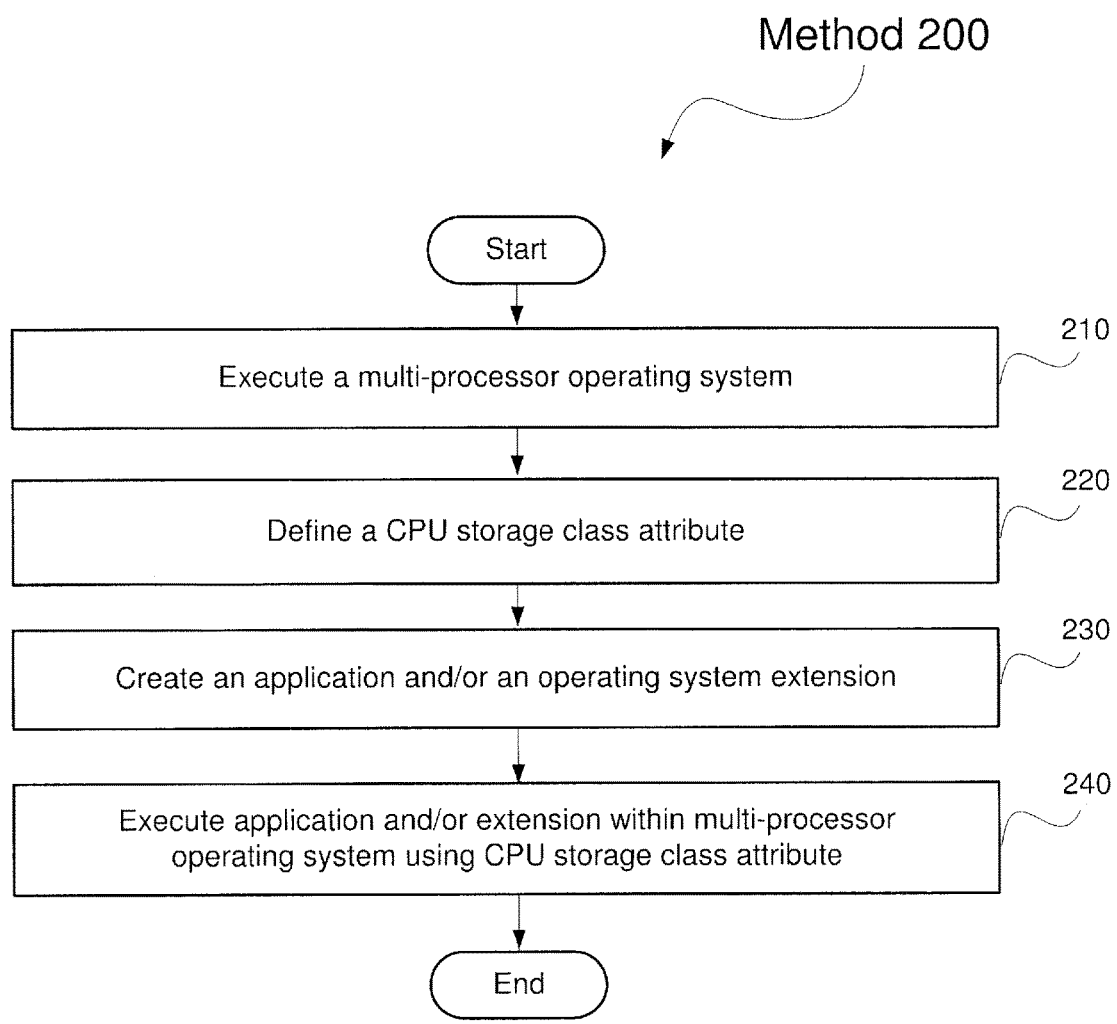

METHOD AND SYSTEM FOR A CPU-LOCAL STORAGE MECHANISM

BACKGROUND

Thread local storage is a computer programming method that supports global/static memory data that is unique to a thread, or task. Data within a static or global variable is typically located in the same memory location when referred to by threads from the same process. However, since each thread has its own stack, variables on the stack are local to the threads and reside in different memory locations. Typically, methods for supporting thread-local storage in a high-level language (e.g., C/C++) require tool chain support. In addition, this conventional method involves the usage of the _thread storage class attribute.

For instance, a global variable is declared as thread-local storage in C/C++ code as, "_thread int errno", wherein errno is used for storing the error code related to functions from the Standard C library. The "errno" thread-local variable can be accessed in C/C++ code as:

```
if (errno == S_objLib_OBJ_TIMEOUT)
    errno = S_eventLIB_TIMEOUT
```

Accordingly, it is common practice for code compilers that support multi-threaded applications to provide a separate instance of "errno" for each thread, in order to avoid different threads competing to read or update the value. Compilers often provide this facility in the form of extensions to the declaration syntax, such as "_thread" annotations on static variable declarations.

SUMMARY OF THE INVENTION

The present invention is related to systems and methods for implementing a processor-local (e.g., a CPU-local) storage mechanism. An exemplary system includes a plurality of processors executing an operating system, the operating system including a processor local storage mechanism, wherein each processor accesses data unique to the processor based on the processor local storage mechanism. Each of the plurality of processors of the system may have controlled access to the resource and each of the processors may be dedicated to one of a plurality of tasks of an application. The application including the plurality of tasks may be replicated using the processor local storage mechanism, wherein each of the tasks of the replicated application includes an affinity to one of the plurality of processors.

A further exemplary system includes a processor executing an operating system and a plurality of instances of an application, wherein the operating system including a processor local storage mechanism, wherein each instance of the application accesses data unique to each instance based on the processor local storage mechanism. Each of the plurality of instances may have controlled access to the resource within the system. The application may also include a plurality of tasks replicated using the processor local storage mechanism, wherein each of the tasks includes an affinity to one of the plurality of instances.

A further exemplary system includes a plurality of processors executing a set of instructions, wherein the set of instructions being operable to execute a multi-processor operating system; define a processor storage class attribute; create one of an application and an extension of the operating system; and execute the one of the application and the extension within the operating system using the processor storage class attribute. Each of the plurality of processors may have controlled access to the resource and each of the processors may be dedicated to one of a plurality of task of an application. The application including the plurality of tasks may be replicated using the processor local storage mechanism, wherein each of the tasks of the replicated application includes an affinity to one of the plurality of processors.

A further exemplary system includes a processor and a set of instructions executing on the processor, wherein the set of instructions being operable to execute a uniprocessor application; define a processor storage class attribute; and execute a multi-instancing function on the uniprocessor application using the processor storage class attribute.

BRIEF DESCRIPTION OF THE DRAWINGS

FIG. 2A illustrates an exemplary method for implementing a CPU-local storage mechanism for the SMP operating system according to the exemplary embodiments of the present invention.

DETAILED DESCRIPTION

Figure 1:
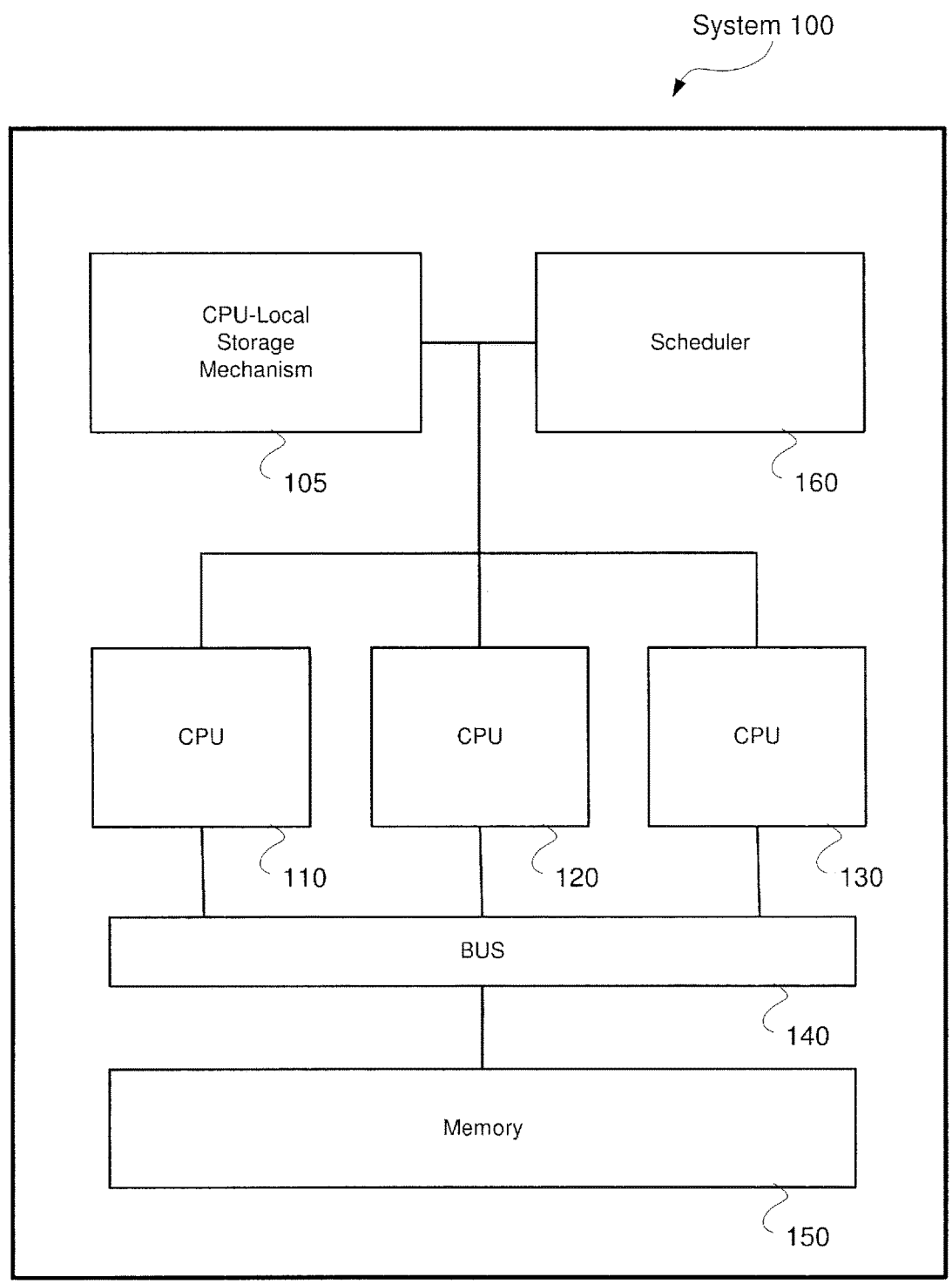
FIG. 1 shows an exemplary symmetric multiprocessing ("SMP") system for implementing a CPU-local storage method according to the exemplary embodiments of the present invention.

The exemplary embodiments of the present invention may be further understood with reference to the following description and the appended drawings, wherein like elements are referred to with the same reference numerals. The exemplary embodiments of the present invention describe methods and systems for implementing a CPU-local storage mechanism.

In software development, multi-core technology is the next transformative technology for the device software optimization ("DSO") industry. Accordingly, software platforms may be enhanced with symmetric multiprocessing ("SMP") capabilities within the operating system, network stack, and development tools in order to provide an efficient path for realizing the benefits of multi-core technology. An SMP system involves a multiprocessor computer architecture wherein two or more identical processors may be connected to a single shared main memory. Furthermore, the SMP architecture may also apply to multi-core processors, where each core may be treated as a separate processor. In other words, a single instance of the operating system may use multiple processors in a single system. The SMP system may maintain the same key real-time operating systems ("RTOS") characteristics of performance, small footprint, high reliability, and determinism as a uniprocessor system configuration.

Advantages of the SMP system include true concurrent execution of tasks and interrupts during multitasking, priority-based concurrent task scheduler for managing the concurrent execution of tasks and automatic load balancing on different processors, mutual exclusion for synchronization between tasks and interrupts received simultaneously on different processors, processor affinity for assigning specific tasks or interrupts to a specific processor, etc. Applications that use an application programming interface ("API") defined for SMP may also have compatibility with a uniprocessor system configuration. In addition, software platforms, such as VxWorks distributed by Wind River Systems, Inc. of Alameda, Calif., may provide SMP simulation capabilities for the development of SMP application without physical hardware. For instance, SMP simulators may be provided with all the standard uniprocessor VxWorks installations as an introduction to the SMP product.

It should be noted that while the exemplary embodiments are described with reference to an SMP operating system, those skilled in the art will understand that the functionality described herein may be transferred to other types of operating systems. Specifically, any other type of operating system that supports a multi-processor architecture or multi-instancing of a single processor. It should also be noted that the terms "processor" and "CPU" are used interchangeably throughout this description and should be understood to mean any type of computing device that is capable of executing instructions, for example, general purpose processors, embedded processors, digital signal processors (DSPs), application specific integrated circuits (ASICs), etc.

According to the exemplary embodiments of the present invention, the CPU-local storage ("CLS") (mechanism?) may be described as a system or method that supports global/static data that is unique per-CPU. In other words, regardless of the number of threads, or tasks, that execute on a CPU, each thread that executes on any given CPU may utilize the same instance of a variable classified as CLS. As will be described in further detail below, the CLS may utilize tool chain support and may involve the usage of a cpu storage class attribute. For example, a global variable may be declared as CPU-local storage in C/C++, as follows:

_cpu TASK_ID taskIdCurrent;

Accessing a CLS variable from C/C++ may involve reading/writing the variable as with any other global/static variable. Such as, for example:

```
TASK_ID taskIdSelf (void)
{
return (taskIdCurrent);
}
```

FIG. 1 shows an exemplary symmetric multiprocessing ("SMP") system 100 for implementing a CPU-local storage method according to the present invention. The exemplary SMP system 100 may include a CPU-local storage ("CLS") mechanism 105. As noted above, the CLS mechanism 105 may increase the usability of operating system products within the SMP system 100. Specifically, the CLS mechanism 105 may allow for users (e.g., end customers, third parties, etc.) to easily and conveniently extend the SMP system 100 by, for example, extending operating system functionality, developing and implementing new applications to operate on the SMP operating system and facilitating the process of multi-instancing a uniprocessor ("UP") application. The CLS mechanism 105 will be described in further details below.

It is noted that throughout this description, the system 100 illustrated in FIG. 1 is referred to as "SMP system" or "SMP operating system." Those skilled in the art will understand that an operating system is stored in a memory and is executed by a processor to act as an interface between hardware and a user. An operating system is responsible for the management and coordination of activities and the sharing of the hardware resources. The operating system further acts as a host for applications that are run on the hardware device. Thus, when referring to the "SMP system" or "SMP operating system," it is intended to refer to the standard definition of an operating system. Thus, when referring to the SMP operating system 100 it is intended to refer to an operating system that is operating on the various hardware devices illustrated in FIG. 1, not to suggest that the hardware devices are part of the operating system.

According to the exemplary embodiments of the present invention, the SMP system 100 may also include a computer architecture having a plurality of identical processors 110, 120 and 130 connected to a shared resource, such as a main memory 150. The SMP system 100 may further include bus 140, or a crossbar switch, for connecting the plurality of processors 110-130 to the shared main memory 150. In addition, each of the processors 110-130 may be in communication with a scheduler 160. As will be described below, the scheduler 160 may be a priority-based preemptive scheduler capable of managing concurrent executions of tasks, as well as performing automatic load balancing of the processors 110-130. Those of skill in the art will understand that the system of FIG. 1 is illustrating a conceptual system that is a combination of hardware and software. For example, the processors 110, 120 and 130, the bus 140 and the memory 150 may be hardware components, while the CLS mechanism 105 and the scheduler 160 may be software components, e.g., lines of software code embodied in a computer readable storage medium that are executed by a processor. However, as described more fully below, this is not a strict definition because it may be that a single component such as a processor may be a combination of hardware components and software code.

The processors 110-130 may be individual microprocessors that are running in parallel as part of a single computing device, may be separate microprocessors that are part of separate computing devices, may be software processes acting as processors, or may be any other similar element capable of executing processes and requesting access to resources. That is, while the term processor is used herein to describe the entity that is attempting to gain access to a resource, those skilled in the art will understand that the entity is not limited to a hardware processor, but may include any number of execution threads that may request access to the resource. Furthermore, the exemplary SMP system 100 may utilize CPU affinity. In other words, the SMP system 100 may have the ability to assign specific tasks and/or interrupts to any one of the processor 110-130.

The SMP architecture illustrated in FIG. 1 may allow for a single instance of an operating system to use the multiple processors 110-130 in the single SMP system 100. Furthermore, the SMP system 100 may allow for multitasking with true concurrent execution of task and/or interrupts, as well as concurrent task scheduling by the preemptive scheduler 160.

According to the exemplary embodiments of the present invention, the SMP system 100 may operate in accordance with exemplary methods 200 and 250 described below and illustrated in FIGS. 2A and 2B, respectively. Current applications and/or extensions of the operating system may be provided with a CPU-local storage mechanism, such as CLS 105. The methods 200 and 250 provide two examples of operations that may be carried out using an exemplary CLS mechanism 105. For example, a user may easily and conveniently extend the SMP operating system using the exemplary method 200. Furthermore, a user may utilize the exemplary method 250 to facilitate the multi-instancing of a uniprocessor application. It should be noted that the methods 200 and 250 will be described with reference to the exemplary system 100 of FIG. 1. However, those of skill in the art will understand that this is only exemplary and that the methods 200, 250 may be implemented within various other systems, having various computer architectures, as well. That is, there may be many other operations that may be carried out using the exemplary CLS mechanism 105 and the operations described in methods 200 and 250 are only exemplary.

FIG. 2A illustrates an exemplary method 200 for implementing a CPU-local storage mechanism 105 for the SMP operating system 100 according to the exemplary embodiments of the present invention. As described above, the exemplary CLS mechanism 105 that is implemented as a programming construct may support global and static data (e.g., variables) that is unique to a specific CPU (e.g., any one of the processors 110, 120 and 130). Regardless of the number of threads that execute on the CPU, each thread that executes on a particular CPU may utilize the same instance of a variable classified as CPU-local storage ("CLS").

It should be noted that the exemplary CPU-local storage mechanism may include software development tools (e.g., such as Wind River Workbench etc.) that may be used by the developer to create, modify, and compile software program applications. The CPU-local storage mechanism may comprise a software suite that includes any number of individual software development programs, such as a compiler, a debugger, an operating system configurator, a source code analyzer, a text editor, etc. These individual programs may either be run independently of a running application or within a main development program. Furthermore, those skilled in the art will also understand that the above described exemplary embodiments may be implemented in any number of manners, including, as a separate software module, as a combination of hardware and software, etc. For example, the CPU-local storage mechanism may be a program containing lines of code stored in any type of computer-readable storage medium that, when compiled, may be executed by a processor.

According to the exemplary method 200, a variable, such as one or more _cpu type variables, may be declared for a processor. Information regarding the declaration of cpu type variables may be packaged by a compiler into an output object module in an executable and linkable format "ELF" section named ".cls_vars". Access to _cpu type variables may result in generated object code invoking an operating system specific primitive _cls_lookup( ). Accordingly, the _cls_lookup( ) primitive may return the address of the specified CPU-local storage variable using a CPU architecture-specific method.

For instance, on an instruction set architecture, such as the IA32 architecture, the GS register may be used to store a base address of the "CPU-local storage area", wherein the return value of _cls_lookup( ) may be defined as the sum of the GS register and an offset. The offset may be based on the specified _cpu type variable that is supplied as an argument. An exemplary implementation of the _cls_lookup( ) may appear as follows:

```
void * _cls_lookup(void * offset)
{
    /* caller must ensure currently executing task is safe
```

```
    from CPU migration */
    unsigned int cpuIndex = sysCpuIndexGet ( );
    return((void *) &(_cls_vars[cpuIndex] + offset));
}
```

According to the exemplary embodiments of the present invention, the method 200 may allow for the exemplary programming construct CPU-local storage mechanism for an operating system such as the SMP operating system 100 illustrated in FIG. 1 to be used to extend the SMP operating system 100 or create an application to be executed within the SMP operating system 100 on a multi-processor architecture. In step 210, the method 200 is executing a multi-processor operating system such as SMP operating system 100. The exemplary CLS mechanism 105 described above is used to extend the SMP operating system 100.

In step 220, the method 200 defines, via a programming construct, a CPU storage class attribute. For example, support of a "_cpu storage" class attribute and a cpu variable library may be added to the CLS mechanism 105 as described in the examples above. Accordingly, these attributes and library may be added to pre-existing variable and structure definitions. In other words, method 200 may add the _cpu storage class attribute to the existing variable and structure definitions. In addition, during step 220, a compiler of the CLS mechanism 105 may package information regarding the declaration of variables, such as _cpu type variables, into an output object module. For instance, the output module may be within an ELF section named .cls_vars.

In step 230, the method 200 may create an application and/or an extension of the operating system. That is, the developer may desire to add functionality to the SMP operating system 100 by adding a new function, task, etc. Similarly, the developer may desire to create a new application that will run in the multi-processor environment using the SMP operating system 100. Thus, in this step the new operating system extension and/or application is created. As described above, current multi-processor operating environments do not allow such a new extension and/or application to be simply inserted and executed in the multi-processor environment. However, as described above the CLS mechanism 105, e.g., as defined in step 220, provides for easy insertion of the new extension or application as described above by supporting global/static data that is unique for each processor.

Thus, in step 240, the method 200 may execute the application and/or extension within the multi-processor operating system using the CPU storage class attribute. It should be noted that the method 200 may access the correct element from the per-CPU structure array. Specifically, access to the variables (e.g., the _cpu type varibables) may result in the generated object code invoking an operating system-specific primitive _cls_lookup( ). As noted above, the process of multi-instancing an application may involve gathering all of the global and static variables into a per-CPU (e.g., a per-processor) structure. Accordingly, these global/static variables may be defined as CPU-local storage variables.

Accordingly, the method 200 may return the address of the specified CPU-local storage variable based on the _cls_lookup( ). For example, a return value of _cls_lookup( ) may be the sum of a GS resister and an offset. This offset may be based on the specified _cpu type variable that was supplied in step 220.

Figure 2B:
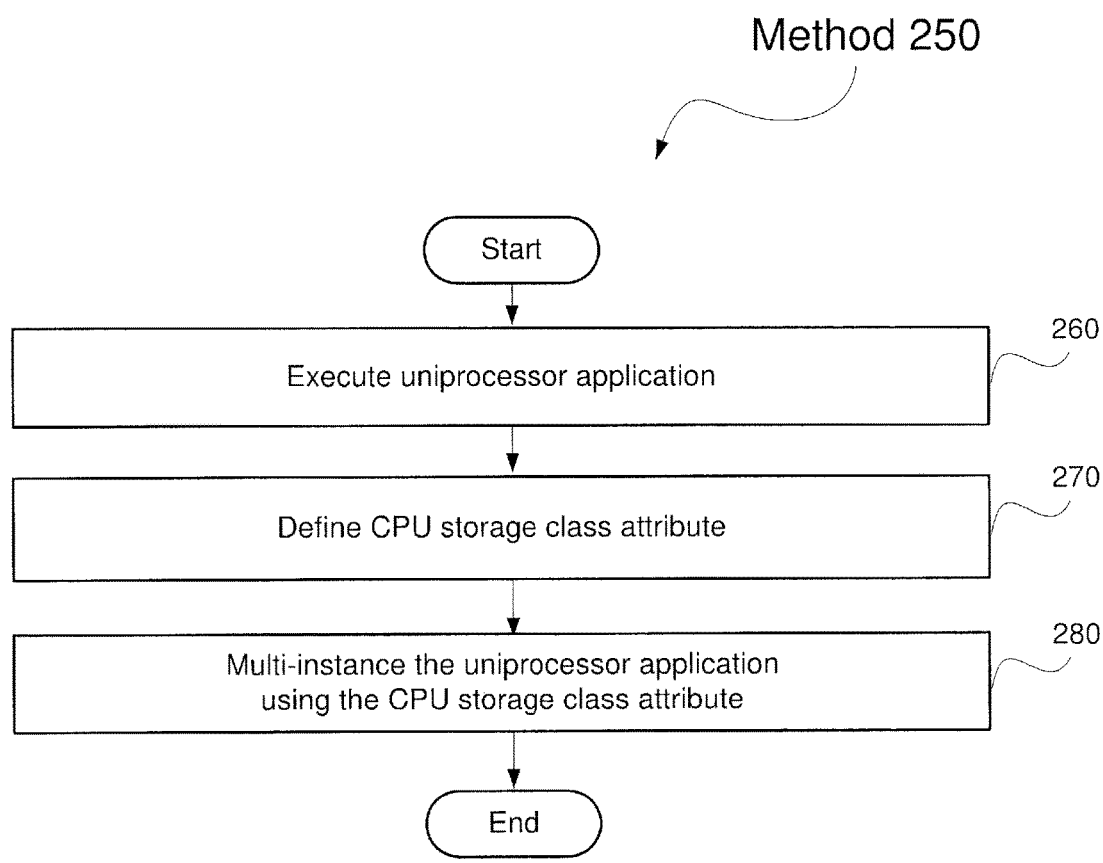
FIG. 2B illustrates an exemplary method for implementing a CPU-local storage mechanism for multi-instancing a uniprocessor application according to the exemplary embodiments of the present invention.

FIG. 2B illustrates an exemplary method 250 for implementing a CPU-local storage mechanism 105 for multi-instancing a uniprocessor application according to the exemplary embodiments of the present invention. As will be described below, the exemplary system 300 of FIG. 3 may implement the method 250 described herein.

In step 260, the method 250 may execute a uniprocessor application. For instance, a user may migrate the uniprocessor application to a multi-core processor platform, such as the SMP system 100. The user may then replicate an exemplary UP application any number of times (e.g., N times) in order to dramatically increase and improve performance. Each of the processors may be dedicated to a given instance of the replicated UP application. The UP application may consist of several tasks, wherein each task includes CPU affinity. In other words, the replication of UP applications may include replicating various tasks in the applications, wherein all of the tasks in the replicated application may have an affinity to the same processor. For example, assume an exemplary UP application consists of 2 tasks, namely, taskA and taskB. If this UP application is to be replicated for a two-processor SMP system, then taskA and taskB may both have an affinity to a first processor (e.g., CPU0), while taskA' and taskB' may both have an affinity to a second processor (e.g., CPU1). Given that the exemplary UP application may already be re-entrant (e.g., the application was already operating correctly within a UP environment), the UP application may only need to be made multi-instance safe in order to operate in the SMP system 100.

In step 270, the method 250 may define a CPU-local storage class attribute according to the exemplary embodiments of the present invention. As described above, the CLS mechanism 150 may be used to add the _cpu storage class attribute to existing variable and structure definitions.

In step 280, the method 250 may multi-instance the uniprocessor application (e.g., execute a multi-instancing function on the application) using the CPU storage class attribute. The process of multi-instancing the UP application may involve gathering all global and static variables into a per-processor (e.g., a per-CPU) structure. In other words, the global and static variables may be the CPU-local storage variables defined in step 270.

Figure 3:
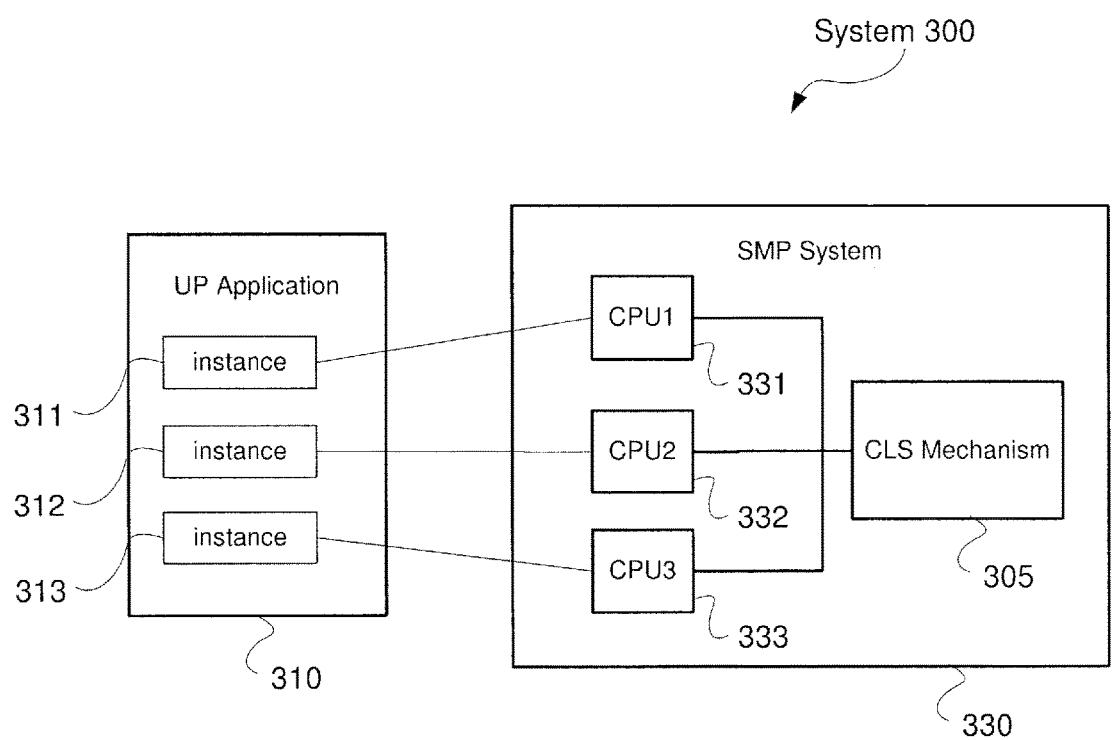
FIG. 3 shows an exemplary system for migrating an existing UP application to a multi-core processor platform executing the SMP system according to the exemplary embodiments of the present invention.

FIG. 3 shows an exemplary system 300 for migrating an existing UP application 310 to a multi-core processor platform executing the SMP system 330 according to the exemplary embodiments of the present invention. The exemplary SMP system 330 may include a CPU-local storage ("CLS") mechanism 305, as well as a plurality of processors, such as CPU1 301, CPU2 302, and CPU3 303. Furthermore, the UP application 310 may include any number of instances (or tasks), such as instances 311, 312, and 313, wherein each instance 311-313 may have a CPU-affinity. In other words, each of the CPUs 301-303 may be dedicated to one of the given instances 311-313 of the replicated UP application 310.

As noted in method 250 of FIG. 2B, an exemplary application, such as the existing UP application 310 may be replicated any number of time (e.g., N times) in order to dramatically increase overall performance. Since the UP application 310 may presumably be operating properly in an UP environment, the application 310 only needs to be made multi-instance safe in order to operate in the SPM system 330. Thus, the CLS mechanism 305 may facilitate the process of multi-instancing the UP application, while providing an easy and convenient mechanism for the user to extend the SMP system 330.

Those of skill in the art will understand that this code is merely exemplary, and that other programming code, in both C and other programming languages, may also be written to implement a CPU-local storage mechanism according to the present invention.

Those skilled in the art will understand that the above described exemplary embodiments may be implemented in any number of manners, including as a separate software module, as a combination of hardware and software, etc. For example, the method 200 may be a program containing lines of code that, when compiled, may be executed by a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A system, comprising:
a multi-core processor platform including a plurality of processors, the multi-core processor platform configured to:
execute a single instance of an operating system and a plurality of instances of a uniprocessor application,
wherein each instance of the uniprocessor application is executed within the single instance of the operating system by a different one of the plurality of processors, the single instance of the operating system including a programming construct configured to define a processor storage class attribute specific to each of the processors, the processor storage class attributes configured to gather a global variable of the uniprocessor application into a per processor structure so that each of the plurality of instances of the uniprocessor application include a per processor global variable,
wherein the programming construct is further configured to label tasks associated with each instance of the uniprocessor application with the processor storage class attribute specific to the corresponding one of the plurality of processors, wherein each instance of the uniprocessor application accesses only data unique to the corresponding processor based on the processor storage class attribute defined by the programming construct.

2. The system of claim 1, wherein each of the plurality of processors has controlled access to a shared resource and each of the processors is dedicated to one of a plurality of tasks of the uniprocessor application.

3. The system of claim 2, wherein each instance of the uniprocessor application including the plurality of tasks is generated using the programming construct.

4. The system of claim 1, wherein the programming construct is further configured to update a source file maintaining variable definition data for one of the plurality of processors.

5. The system of claim 1, wherein the programming construct is further configured to generate object code invoking a lookup function based on an accessed element from a processor structure array, performs the lookup function, and returns an address of a specified processor local storage variable.

6. The system of claim 1, further including:
a compiler packaging information for declaration of a plurality of variables into an output object module.

7. The system of claim 6, wherein the output object module is located within an executable and linkable format "ELF" section of one of the plurality of variables.

8. The method of claim 1, wherein the plurality of instances of the uniprocessor application are generated based on applying the storage class attributes to the uniprocessor application.

9. A system, comprising:
a multi-core processor platform including a plurality of processors, the multi-core processor platform configured to:
execute a single instance of an operating system and a plurality of instances of an application, wherein each instance of the application is executed by a different one of the plurality of processors,
wherein the single instance of the operating system includes a programming construct configured to define a processor storage class attribute specific to each of the plurality of instances of the application, the processor storage class attributes configured to gather a global variable of the application into a per processor structure so that each of the plurality of instances of the application include a per processor global variable, wherein the programming construct is further configured to label tasks associated with each instance of the application with the processor storage class attribute specific to the corresponding one of the instances of the application, wherein each instance of the application only accesses data unique to each instance of the application based on the processor storage class attributes defined by the programming construct.

10. The system of claim 9, wherein each of the plurality of instances has controlled access to a shared resource.

11. The system of claim 9, wherein the application includes a plurality of tasks generated using the programming construct, each of the tasks includes an affinity to one of the plurality of instances.

12. The system of claim 9, wherein the programming construct is further configured to update a source file maintaining variable definition data for one of the plurality of instances.

13. The system of claim 9, wherein the programming construct is further configured to generate object code invoking a lookup function based on an accessed element from a processor structure array, performs the lookup function, and returns an address of a specified processor local storage variable that is unique per instance of the application.

14. The system of claim 9, further including:
a compiler packaging information for declaration of a plurality of variables into an output object module.

15. The system of claim 14, wherein the output object module is located within an executable and linkable format "ELF" section of one of the plurality of variables.

16. A system, comprising:
a plurality of processors configured to perform operations comprising:
execute a single instance of an operating system;
define a processor storage class attribute specific to each of the plurality of processors;
generate a first instance of a uniprocessor application and a second instance of the uniprocessor application using the processor storage class attributes, wherein the processor storage class attributes are configured to gather a global variable of the uniprocessor application into a per processor structure so that the first instance of the uniprocessor application and the second instance of the uniprocessor application each include a per processor global variable;
label tasks associated with the first instance of the uniprocessor application with the processor storage class attribute specific to a first processor of the plurality of processors;
label tasks associated with the second instance of the uniprocessor application with the processor storage class attribute specific to a second processor of the plurality of processors; and
execute the first instance of the uniprocessor application and the second instance of the uniprocessor application within the single instance of the operating system, wherein the first instance of the uniprocessor application is executed by the first processor and the second instance of the uniprocessor application is executed by the second processor based on the corresponding processor storage class attributes.

17. The system of claim 16, wherein each of the plurality of processors has controlled access to a shared resource.

18. The system of claim 17, wherein the first instance of the uniprocessor application and the second instance of the uniprocessor application are generated using a programming construct.

19. The system of claim 16, the operations further comprising:
update a source file maintaining variable definition data for one of the plurality of processors.

20. A system, comprising:
a multi-core processor platform including a plurality of processors configured to perform operations comprising:
execute a single instance of an operating system;
execute a uniprocessor application within the single instance of the operating system;
define a processor storage class attribute specific to each of the plurality of processors, the processor storage class attributes to be utilized by a multi instancing function; and
execute the multi-instancing function on the uniprocessor application to generate a plurality of instances of the uniprocessor application, each of the plurality of instances of the uniprocessor application configured to be executed by a different one of the plurality of processors, wherein executing the multi instancing function includes utilizing the processor storage class attributes to gather a global variable of the uniprocessor application into a per processor structure so that each of the plurality of instances of the uniprocessor application include a per processor global variable unique to the corresponding processor based on the processor storage class attributes.

* * * * *